United States Patent [19]
Sakabe et al.

[11] Patent Number: 5,701,527
[45] Date of Patent: Dec. 23, 1997

[54] CAMERA CAPABLE OF MEASURING POWER SOURCE VOLTAGE

[75] Inventors: Namiko Sakabe, Mussahino; Toshiaki Ishimaru, Hino; Yoshiaki Kobayashi, Hachioji; Takashi Suzuki, Hino, all of Japan

[73] Assignee: Olympus Optical Co., Ltd., Tokyo, Japan

[21] Appl. No.: 360,406

[22] Filed: Dec. 21, 1994

[30] Foreign Application Priority Data

Dec. 27, 1993 [JP] Japan .................................. 5-348806
Dec. 6, 1994 [JP] Japan .................................. 6-302446

[51] Int. Cl.$^6$ .................................................. G03B 7/26
[52] U.S. Cl. ........................................ 396/277; 396/303
[58] Field of Search ........................ 354/484, 127.1, 354/127.12; 324/427, 433, 43; 340/636; 320/48, 39; 396/277, 279

[56] References Cited

U.S. PATENT DOCUMENTS

| | | | |
|---|---|---|---|
| 4,126,874 | 11/1978 | Suzuki et al. | 354/60 |
| 4,258,999 | 3/1981 | Tominaga | 354/268 |
| 4,725,784 | 2/1988 | Peled et al. | 324/427 |

FOREIGN PATENT DOCUMENTS

| | | | |
|---|---|---|---|
| 62-39829 | 2/1987 | Japan | G03B 7/26 |
| 5-150303 | 6/1993 | Japan | G03B 17/00 |

Primary Examiner—Safet Metjahic
Assistant Examiner—Eric Nelson
Attorney, Agent, or Firm—Frishauf, Holtz, Goodman, Langer & Chick

[57] ABSTRACT

A battery check device for a camera which includes a discharging circuit to which current flows from a battery and a discharging time setting device for setting a discharging time for determining that an internal resistance of the battery has increased due to non-use of the battery so as to temporarily reduce an output voltage of the battery. The discharging time set by the discharging time setting device is longer than a time required to check the residual energy amount of the battery. A determining device determines whether a voltage of the discharging circuit has reached a reference voltage specific to the battery within the discharging time. It is determined that the residual energy amount of the battery is sufficient and that the internal resistance of the battery has merely increased due to non-use of the battery when the determining device determines that the voltage of the discharging circuit has reached the reference voltage specific to the battery within the discharging time but after the time required to check the residual energy amount of the battery. And it is determined that the residual energy amount of the battery is insufficient when the determining device determines that the voltage of the discharging circuit has not reached the reference voltage specific to the battery within the discharging time.

14 Claims, 12 Drawing Sheets

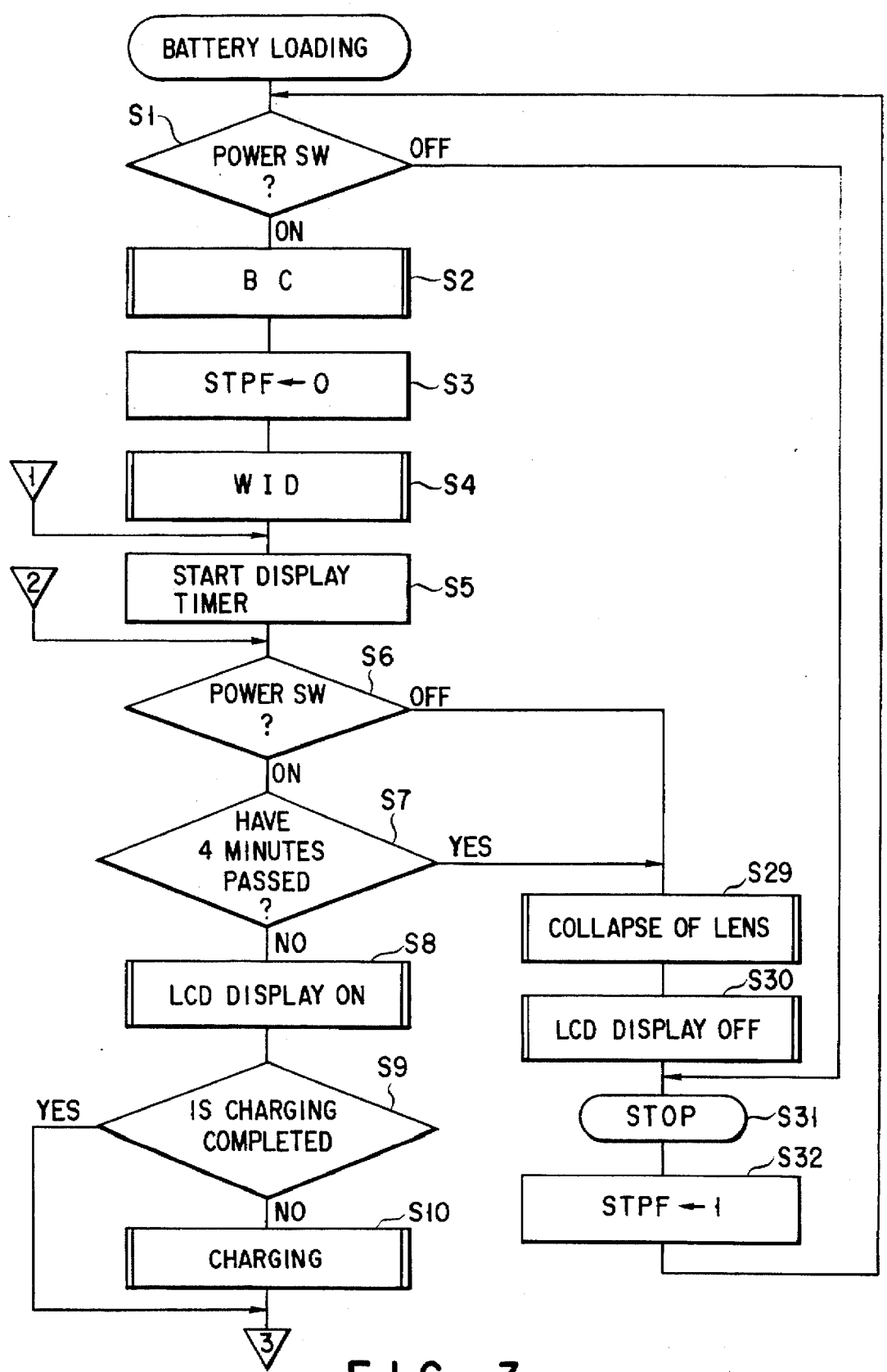
F I G. 3

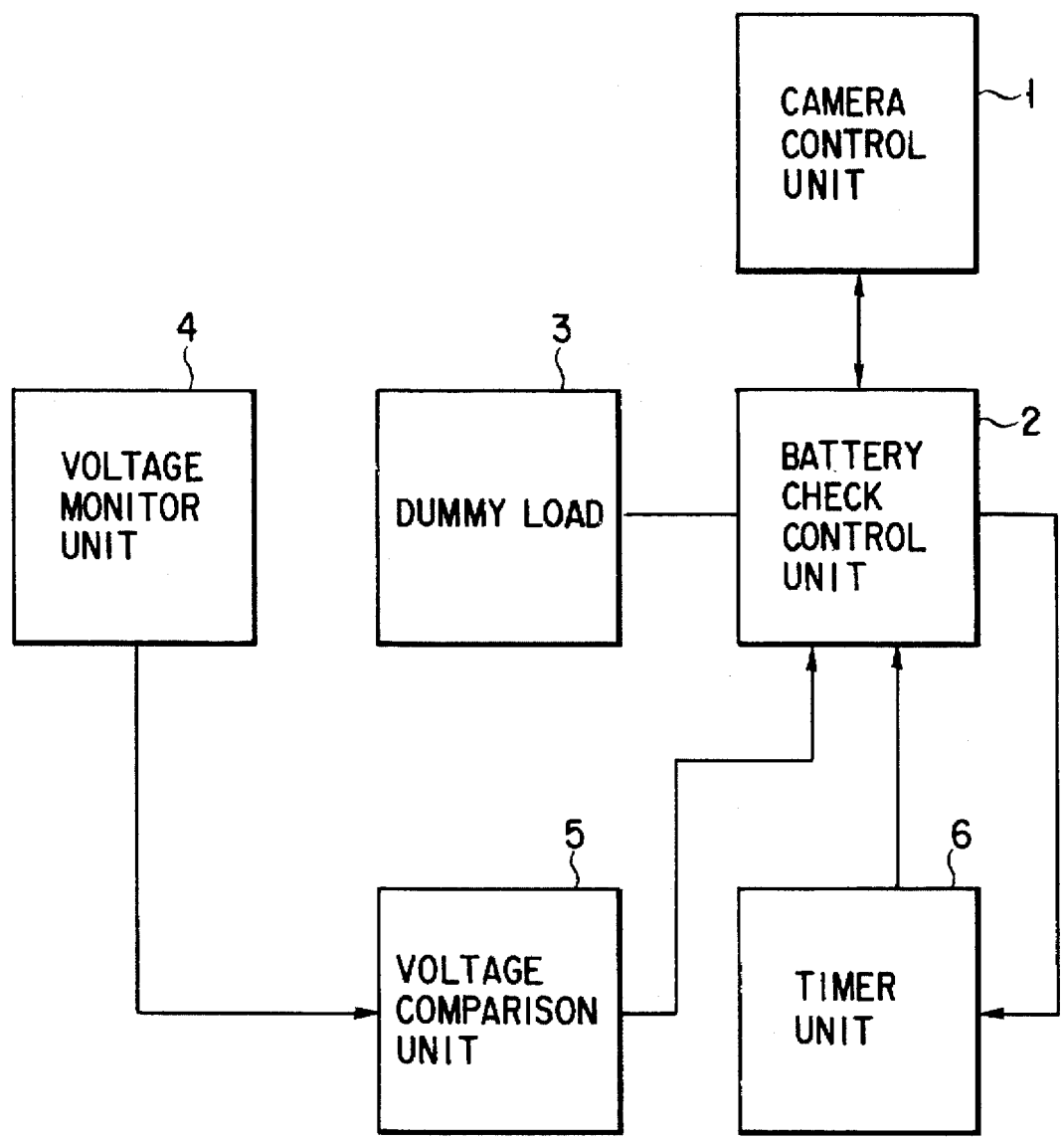
F I G. 5

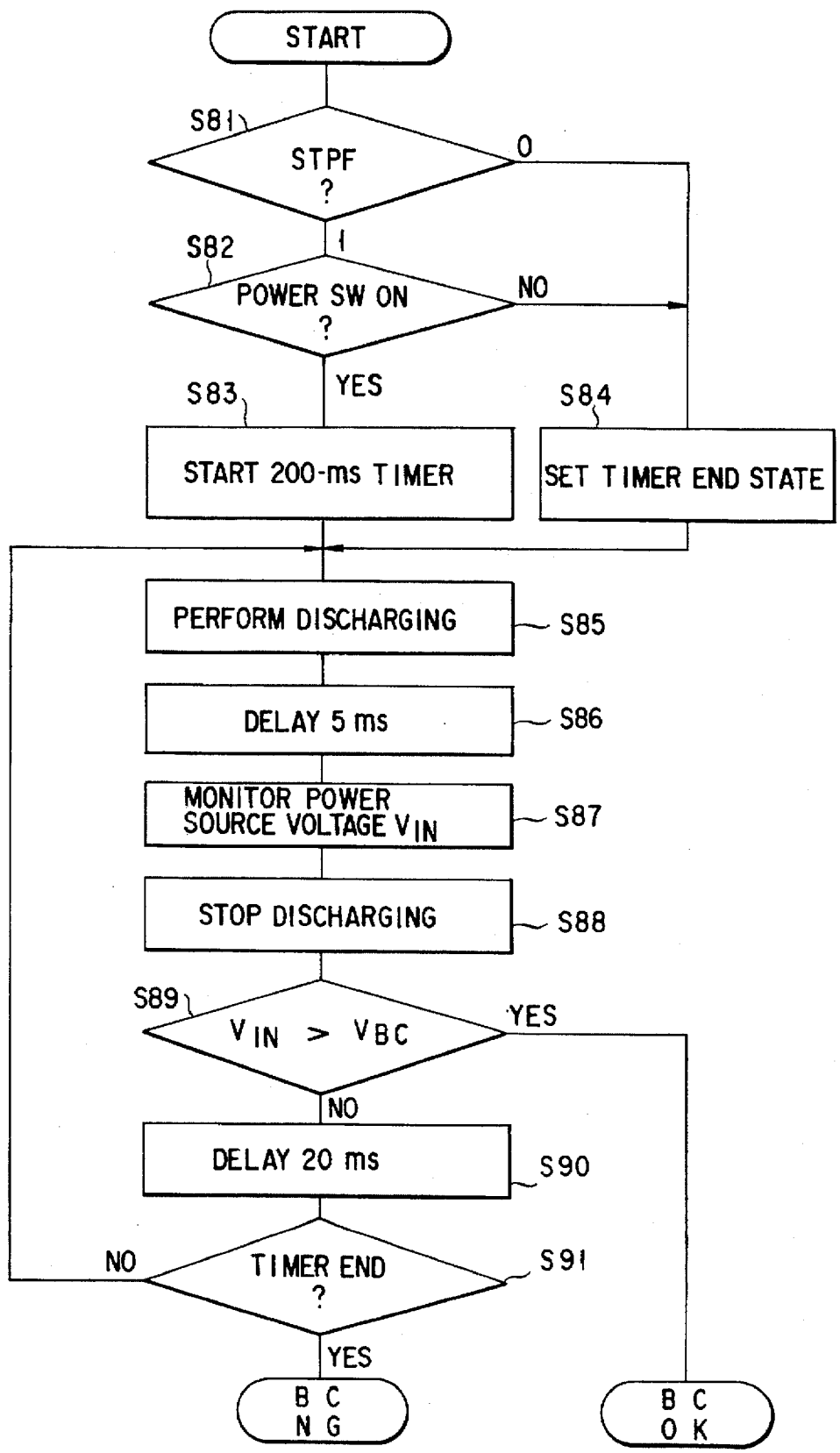
F I G. 11

ID # 1

CAMERA CAPABLE OF MEASURING POWER SOURCE VOLTAGE

BACKGROUND OF THE INVENTION

1. Field of the Invention

The present invention relates to a camera capable of measuring a power source voltage corresponding to a battery having a high impedance during initial discharging.

2. Description of the Related Art

As power sources for cameras, batteries are generally used. In order to detect residual energy amounts of the batteries, many cameras have power source voltage measuring (battery check) functions.

The battery check function detects the residual energy amount of a battery serving as a power source for a camera to decide whether the residual energy amount reaches a level at which the camera is normally operated.

As a practical method of a conventional battery check function, for example, the following method is used. That is, an operation current value requiring a current value larger than a normal current value, e.g., a current having a value almost equal to the value of a current required for driving a film winding/rewinding motor or the like is discharged from a battery. At this time, a power source voltage is measured. In addition, it is decided whether the measured value is large enough to operate a camera.

The internal resistance of a battery is obtained by the difference between the open-circuit voltage of the battery and a voltage obtained when discharging of the battery is performed.

Since it is generally known that the internal resistance of a battery correlates with the residual energy amount of the battery, the residual energy amount of the battery can be predicted by measuring the voltage value of the battery during discharging.

In a conventional alkaline-manganese battery which uses mercury as a catalyst for a chemical reaction in the battery, a time required for stabilizing the speed of the chemical reaction at the start of discharging is very short. On the other hand, when the chemical reaction at the start of discharging is slow, a current cannot satisfactorily flow in the battery. For this reason, the internal resistance of the battery increases. Therefore, in the conventional battery, a time required for stabilizing a chemical reaction is very short. For this reason, even when a voltage is measured within a short time, no problem is posed because the internal resistance of the battery is low.

For this reason, a discharging time for a battery check may be very short, and the residual energy amount of the battery can be correctly measured by measuring a voltage obtained after discharging is performed for several ms.

However, in recent years, mercury-free alkaline-manganese batteries have been developed for environmental reasons, and the mercury-free alkaline-manganese batteries are popular on the market. A new mercury-free alkaline-manganese battery has initial discharging characteristics poorer than those of a conventional new mercury-containing alkaline-manganese battery, and the mercury-free alkaline-manganese battery has an internal resistance twice that of the mercury-containing alkaline-manganese battery. That is, in the mercury-free alkaline-manganese battery, a so-called sleeping phenomenon occurs. This phenomenon is named a sleeping phenomenon because, when the new mercury-free alkaline-manganese battery is energized by applying a load thereon for a predetermined time, the characteristics of the mercury-free alkaline-manganese battery are restored to characteristics which are almost the same as those of a conventional alkaline-manganese battery.

In this case, the above-described sleeping phenomenon will be described below with reference to FIGS. 12 and 13 on the basis of the characteristics of a mercury-free alkaline-manganese battery.

FIG. 12 shows the discharging characteristics of a mercury-free alkaline-manganese battery. In FIG. 12, the ordinate is obtained by plotting a voltage and a resistance value (impedance value), and the abscissa is obtained by plotting the number of times of discharging.

Discharging characteristic curves in FIG. 12 are constituted by a battery open-circuit voltage (non-load voltage) $V_O$ obtained immediately before discharging, a battery voltage $V_L$ obtained immediately after discharging is started, and an internal impedance r ($r=\Delta V/I$) of the battery obtained from a difference $\Delta V$ ($\Delta V=V_L-V_O$) between both the voltages and a discharging load current (a constant current load which does not depend on the voltages) I. The battery open-circuit voltage $V_O$, the battery voltage $V_L$, and the internal impedance r are obtained when intermittent discharging in which 3-second discharging is performed at 30-second intervals is performed.

As shown in FIG. 12, the battery open-circuit voltage $V_O$ monotonously decreases in proportion to an increase in the number of times of discharging. In addition, the battery voltage $V_L$ obtained immediately after discharging is started relatively rapidly and monotonously increases until the number of times of discharging reaches n. When the number of times of discharging exceeds n, the battery voltage $V_L$ monotonously decreases. The internal impedance r of the battery relatively rapidly and monotonously decreases until the number of times of discharging reaches n. When the number of times of discharging exceeds n, the internal impedance r slightly monotonously increases.

As described above, it is understood that the internal impedance of the battery obtained immediately after discharging is high until the number of times of discharging reaches n after the discharging is started and that the battery exhibits the discharging characteristics of a standard battery when the number of times of discharging exceeds n.

In addition, changes in voltage during T-second discharging in one discharging operation of the n discharging operations are shown in FIG. 13. A voltage which is set to be $V_O$ before discharging temporarily drops to the voltage $V_L$, and then continuously increases for t seconds (T>>t). Thereafter, the voltage reaches a steady voltage at an intermediate voltage between the voltages $V_O$ and $V_L$. The discharging is ended T seconds after the discharging is started, and the voltage returns to the voltage $V_O$.

In this manner, it is understood that, in discharging characteristics obtained when the number of times of discharging reaches n immediately after the discharging is started, an internal impedance is high because the battery voltage is low. This is just a sleeping phenomenon.

In the state of the sleeping phenomenon, when discharging is continuously performed further, a chemical reaction is satisfactorily performed. For this reason, when several hundreds ms have passed, the internal resistance is stabilized, the battery exhibits a normal internal resistance. More specifically, in such a battery, discharging is effectively performed for a predetermined time or more to eliminate a sleeping phenomenon. Note that, when an alkaline-manganese battery is used, the chemical reaction of the battery influences an internal resistance. For this reason, a battery which is not used for a long time also has the characteristics of a sleeping phenomenon which is the same as that of a new battery.

In general, when a conventional battery check function is used in the state of the sleeping phenomenon, the voltage drop is doubled. That is, a voltage is monitored at a point at which the internal resistance is doubled. Therefore, the correlation between the internal resistance value and a residual energy amount cannot be maintained, and the residual energy amount of the battery cannot be correctly decided.

More specifically, in a conventional technique, although the above sleeping phenomenon may occur depending on the types of batteries to be used, a battery check in consideration of the sleeping phenomenon is not performed. For this reason, when a mercury-free alkaline-manganese battery is used, although it is new, the conventional battery check erroneously determines that the battery has a small residual energy amount. In addition, a battery having a residual energy amount which is sufficiently large may be erroneously determined to be a battery having a small residual energy amount because the battery has not used for a long time.

SUMMARY OF THE INVENTION

The present invention has been made in consideration of the above circumstances, and has as its object to provide a camera, capable of measuring a power source voltage, in which a measurement voltage is compared with a reference voltage when a predetermined time from the start of discharging to time at which a sleeping phenomenon is predicted to be ended has passed to detect a residual energy amount of the battery, and, when a mercury-free alkaline-manganese battery which is new or which has not been used for a long time is to be checked, the mercury-free alkaline-manganese battery is not erroneously determined to have a small residual energy amount.

In addition, the present invention has been made to rationally solve the above drawbacks, and has as its object to provide a camera in which before a predetermined time from the start of discharging to time at which a sleeping phenomenon is predicted to be ended has passed, it is decided whether the sleeping phenomenon may occur from an operating state of the camera, a battery check is performed in accordance with the determination result within or after a predetermined time, the voltage of a battery which causes a sleeping phenomenon in which a high impedance is generated in initial discharging can be accurately checked without any error, and when a high impedance is not generated in a starting state of the camera, a power source voltage can be measured with a time lag as short as possible.

According to one aspect of the present invention, in order to achieve the above objects, there is provided a camera, capable of measuring a power source voltage, which causes a current to flow in a discharging circuit to measure the power source voltage, comprising initial discharging characteristic determining means for determining whether initial discharging characteristics of a power source have a level which is not more than a predetermined level by setting an internal resistance of the power source to be higher than a predetermined value, and operation stopping means for stopping an operation of the camera when the initial discharging characteristic determining means decides that the initial discharging characteristics have the level which is not more than the predetermined level.

According to another aspect of the present invention, there is provided a camera, capable of measuring a power source voltage, which causes a current to flow in a discharging circuit each time a predetermined operation related to photography is performed to measure the power source voltage, comprising mode state determining means for determining whether it is determined that a mode state is kept set in a normal mode in which a normal photographic sequence is performed or that the mode state is changed from a power-saving mode having power consumption smaller than that of the normal mode to the normal mode, discharging time setting means for, when it is determined that the mode state determining means determines that the mode state is changed to the normal mode, setting a current flowing in the discharging circuit to a current of a first predetermined time and, when it is determined that the mode state is kept set in the normal mode, setting the current flowing in the discharging circuit to a current of a second predetermined time shorter than the first predetermined time, voltage determining means for determining whether a measurement value after the first or second predetermined time set by the discharging time setting means is larger or smaller than a predetermined voltage value, and inhibiting means for, when the voltage determining means determines that the measurement value is smaller than the predetermined value, determining that an internal resistance of the power source is higher than a predetermined value and that initial discharging characteristics of the power source do not reach a predetermined level, thereby inhibiting an operation of the camera.

According to still another aspect of the present invention, there is provided a camera, capable of measuring a power source voltage, which causes a current to flow in a discharging circuit each time a predetermined operation related to photography is performed to measure the power source voltage, comprising mode state determining means for determining whether it is determined that a mode state of the camera is kept set in a normal mode in which a normal photographic sequence is performed or that the mode state is changed from a power-saving mode having power consumption smaller than that of the normal mode to the normal mode, timer means for measuring a discharging time preset within a time shorter than a time in which an internal resistance of the power source is higher than a predetermined value, voltage determining means for determining whether a dummy voltage measurement value obtained when a current flows in the discharging circuit for only the preset discharging time is larger or smaller than a predetermined comparison voltage value, and discharging controlling means for, when the voltage determining means decides that the measurement value voltage is higher than the comparison voltage value, deciding that the power source voltage is normal and, when the measurement value voltage is lower than the comparison voltage value, controlling the timer means and the voltage determining means such that the voltage determination is repeated a predetermined number of times in only the power-saving mode.

According to one aspect of the present invention, immediately before a battery check is performed, a discharging time is set in accordance with whether the camera is set in a starting state, and an operation of the camera is controlled depending on comparison between the predetermined voltage and the measured voltage. Therefore, when the camera is set in a starting state, a battery check can be performed without an unnecessary time lag; when a sleeping phenomenon occurs in a battery serving as a camera power source, an accurate battery check can be performed.

According to another aspect of the present invention, a discharging time is set in accordance with a change in mode state of the camera, and the operation of the camera is controlled depending on the comparison between the predetermined voltage and the measured voltage. Therefore, a battery check can be performed in a normal mode without an unnecessary time lag.

According to still another aspect of the present invention, the number of times of discharging within a predetermined time in which a sleeping phenomenon is supposed to be eliminated is set in accordance with a change in mode state of the camera, and a battery check is performed depending on comparison between the predetermined voltage and the measured voltage while discharging is performed the set number of times. Therefore, the battery check can be performed without an unnecessary time lag in a normal mode and immediately after the sleeping phenomenon is ended.

According to the present invention, when a mode is changed from a power-saving mode to a normal mode, as in a case wherein the photographic sequence of the camera is not set in a starting state, a discharging time longer than a time corresponding to the sleeping phenomenon of the battery is set, and a battery check can be accurately performed without any error.

BRIEF DESCRIPTION OF THE DRAWINGS

FIG. 3 is a flow chart showing a main process of the basic example;

FIG. 5 is a block diagram showing the arrangement of a camera capable of measuring a power source voltage according to the first embodiment of the present invention;

FIG. 11 is a flow chart showing a battery check process executed in the fourth embodiment of the present invention;

DETAILED DESCRIPTION OF THE PREFERRED EMBODIMENTS

A basic example and several embodiments of the present invention will be described below with reference to the accompanying drawings.

The basic example of the present invention will be described below prior to a description of the embodiments (to be described later) of the present invention.

Figure 1:
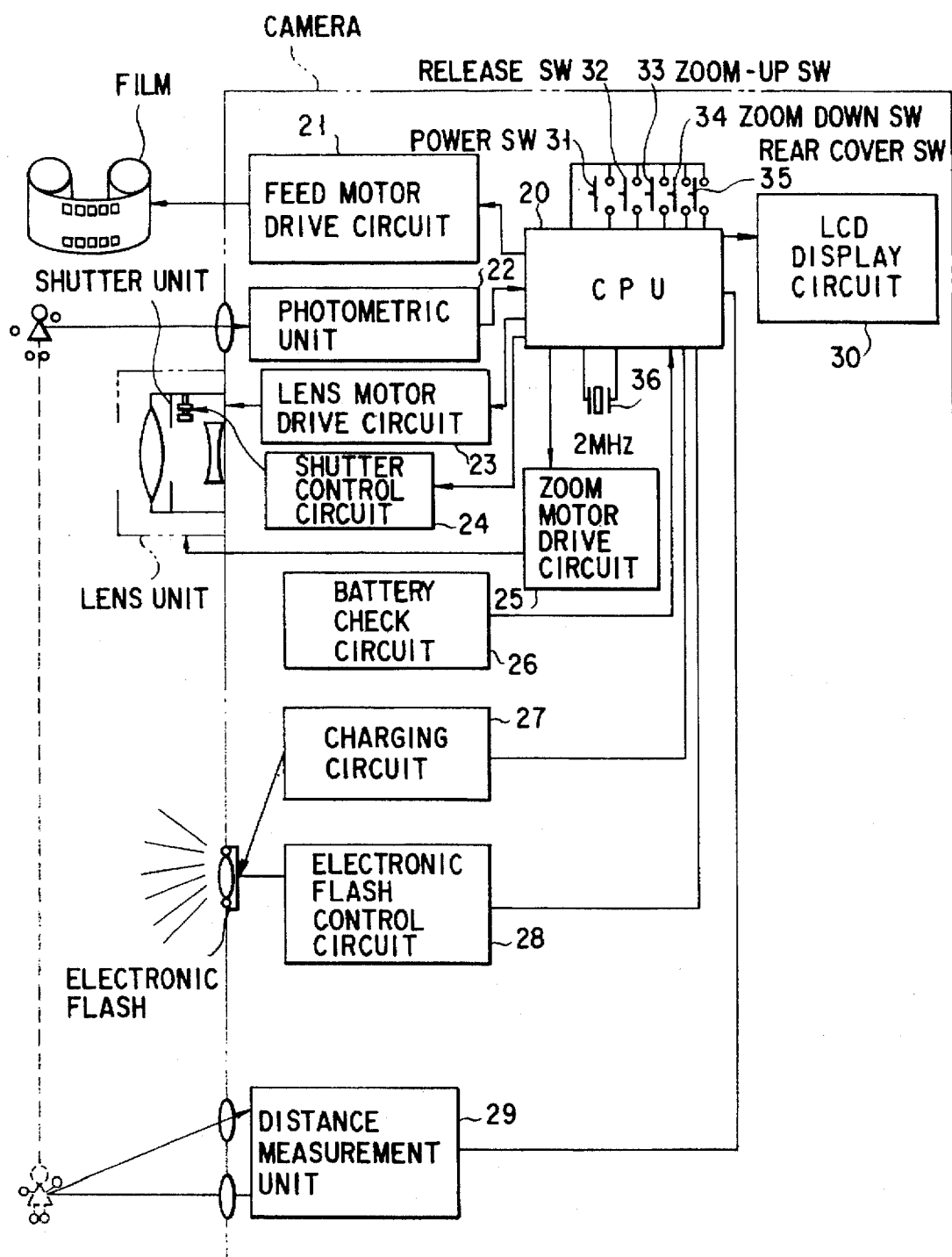
FIG. 1 is a block diagram showing the arrangement of a basic example of a camera capable of measuring a power source voltage according to the present invention.

FIG. 1 is a block diagram showing the basic example of a camera, capable of measuring a power source voltage, to which the embodiments (to be described later) of the present invention are applied.

This camera is a zooming camera having an automatic focusing function, and a power switch (power SW) 31, a release switch (release SW) 32, a zoom-up switch (zoom-up SW) 33, a zoom-down switch (zoom-down SW) 34, and a rear cover opening/closing detection switch (rear cover SW) 35 are connected to a central processing unit (CPU) 20 in the camera. The CPU 20 performs control in accordance with these switches.

In addition, a feed motor drive circuit 21, a photometric unit 22, a lens motor drive circuit 23, a shutter control circuit 24, a zoom motor drive circuit 25, a battery check circuit 26, a charging circuit 27, an electronic flash control circuit 28, a distance measurement unit 29, and a liquid crystal display circuit (LCD display circuit) 30 for displaying a battery state and the number of frames are connected to the CPU 20.

When a signal is output from the CPU 20 to the zoom motor drive circuit 25 upon operation of the zoom-up switch 33 or the zoom-down switch 34, zoom driving is performed for a lens unit. The charging circuit 27 is driven on the basis of a signal output from the photometric unit 22 through the CPU 20, thereby performing charging for causing an electronic flash to emit light. Moreover, the feed motor drive circuit 21 is driven on the basis of a signal output from the CPU 20 in response to a signal generated by the rear cover open/close detection SW 35 when the rear cover of a camera body is closed, thereby performing blind exposure of a film.

When the release switch 32 is turned on, the photometric unit 22 and the distance measurement unit 29 detect the luminance and distance of an object to be photographed, and a photographic lens unit is driven by the lens motor drive circuit 23 through the CPU 20. A shutter unit is controlled, through the shutter control circuit 24, by a shutter speed signal corresponding to the luminance from the CPU 20.

When the electronic flash must emit light, control for causing an electronic flash to emit light is performed by the electronic flash control circuit 28 through the CPU 20.

When the power switch 31, the release switch 32, the zoom-up switch 33, the zoom-down switch 34, and the rear cover SW 35 are operated, or a battery (not shown) serving as a camera power source is loaded, the battery check circuit 26 performs a battery check. When the power source voltage is low, the camera is locked through the CPU 20. When the voltage is sufficiently high, operations are performed in accordance with the switches, respectively.

A clock for operating the CPU 20 is produced by a 2-MHz oscillator 36 connected to the CPU 20.

Figure 2:
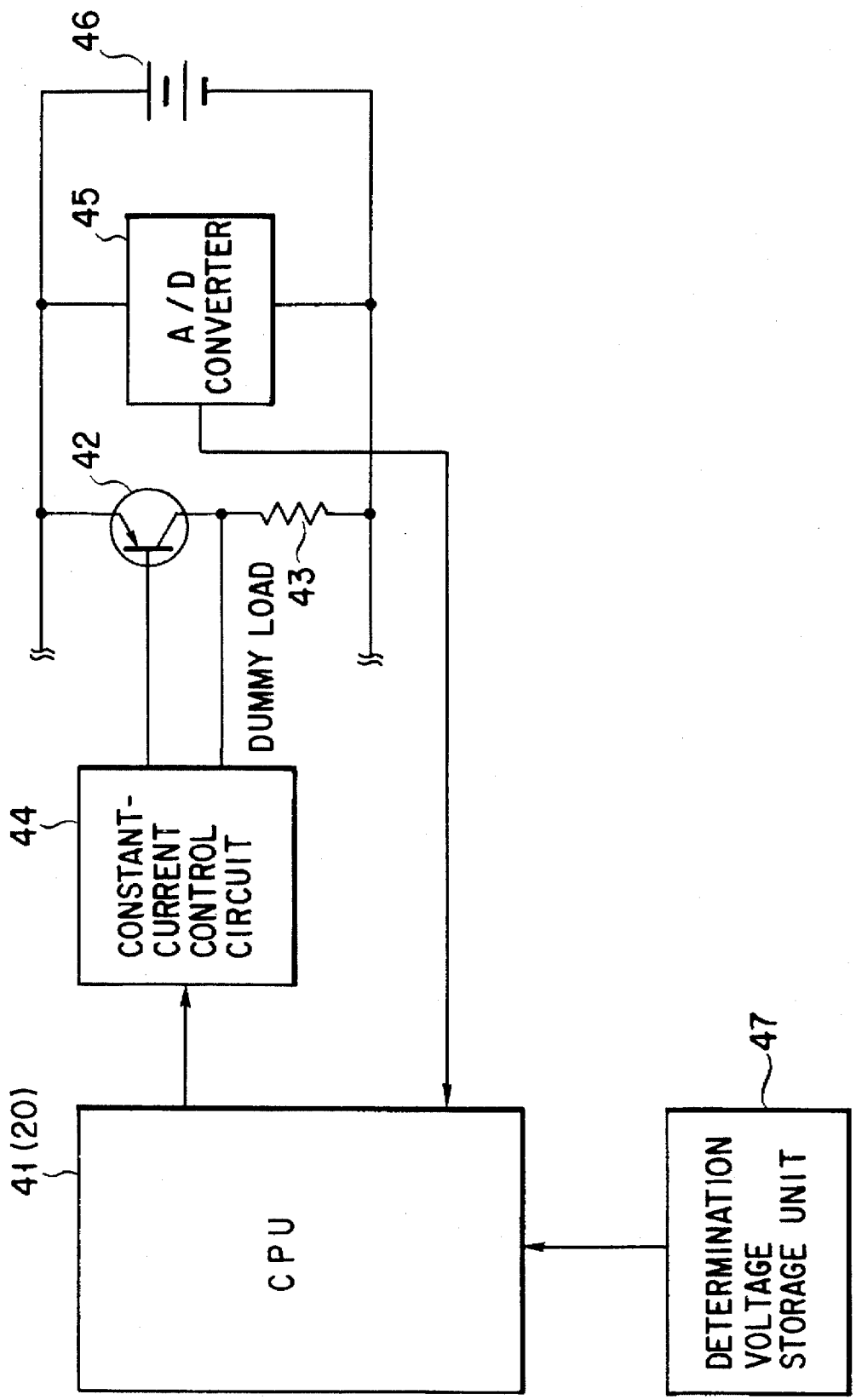
FIG. 2 is a view showing the details of a battery check circuit 26 in the basic example.

FIG. 2 is a view showing the details of the battery check circuit 26 of the above basic example.

A transistor 42 is a transistor for controlling energization for a dummy load 43 to perform a battery check. A constant-current control circuit 44 monitors a collector output from the transistor 42 to keep a current to the dummy load 43 constant regardless of the voltage of a power source (battery) 46. The operation of the constant-current control circuit 44 is controlled by a CPU 41 (20). An analog/digital (A/D) converter 45 monitors the voltage of the (battery) power source 46 which energizes the dummy load 43. A digital output from the A/D converter 45 is output to the CPU 41 (20).

A reference voltage value stored in a determination voltage storage unit 47 in advance is compared with the digital output by the CPU 41 (20) to decide whether the voltage of the power source 46 is sufficient or insufficient. On the basis of this result, the residual amount state of the battery is displayed on the liquid crystal (LCD) display circuit 30 shown in FIG. 1.

Note that, as the determination voltage storage unit 47, for example, a nonvolatile memory such as an electrically erasable and programmable read only memory (EEPROM) is used. In addition, variations in A/D converters of cameras may be separately adjusted.

Figure 4:
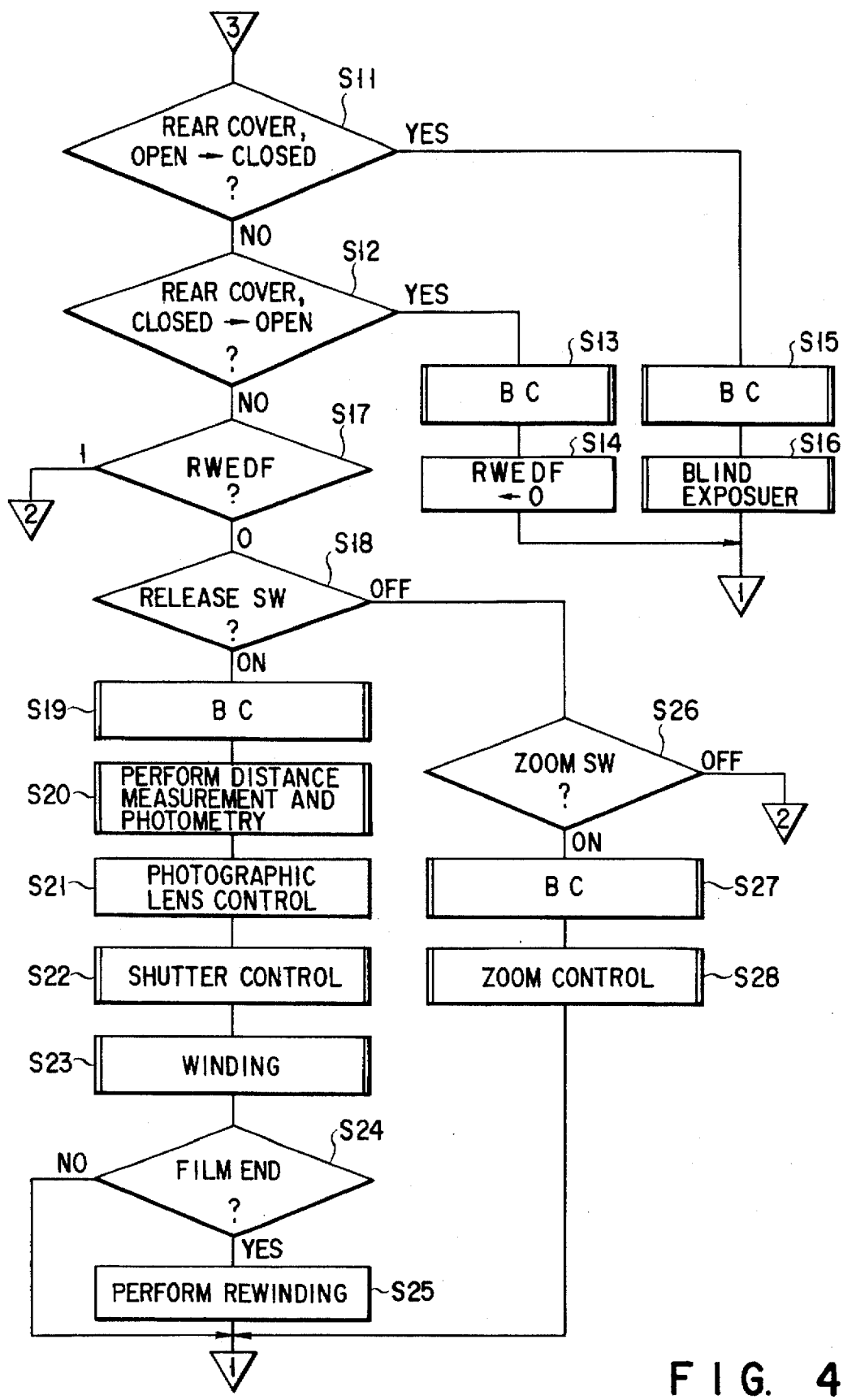
FIG. 4 is a flow chart showing a main process of the basic example.

FIGS. 3 and 4 are flow charts showing the main processes of the basic example of the present invention.

When the power source (battery) 46 is loaded, it is decided whether the power switch 31 is set in an ON or OFF state (step S1). If the power switch 31 is set in an ON state, the flow advances to step S2. If the power switch 31 is set in an OFF state, the flow advances to step S31.

In step S2, a battery check is performed in a subroutine "battery check" (to be referred to as "BC" hereinafter). Thereafter, a flag STPF is set to be "0" in step S3. In this case, the flag STPF is a flag representing a mode state of an operation. The flag STPF is set to be "0" in a normal mode, and the flag STPF is set to be "1" when a power-saving mode is changed to the normal mode.

The normal mode used in this case indicates a state wherein the CPU 20 always performs some camera operation process, and the power-saving mode indicates a state wherein current consumption is decreased because the oscillator 36 is stopped by an instruction "STOP" of the CPU 20, thereby setting the CPU 20 inactive.

In step S4, a process of setting lens unit zooming in a wide state is performed in a subroutine "WID". Thereafter, a display timer (not shown) in the CPU 20 is started in step S5.

In step S6, it is decided again whether the power switch 31 is set in an ON or OFF state. When the power switch 31 is set in an ON state, the flow advances to step S7. When the power switch 31 is set in an OFF state, the flow advances to step S29. In step S7, it is decided whether four minutes have passed after the power switch 31 is turned on. If NO in step S7, the LCD display circuit 30 is turned on to perform a display (step S8), and the flow advances to step S9. If YES in step S7, the flow advances to step S29.

In step S9, it is decided whether charging of an electronic flash is completed. If YES in step S9, the flow advances to step S11. If NO in step S9, the electronic flash is charged in step S10.

In step S11, it is decided whether the state of the rear cover is changed from an open state to a closed state by the rear cover SW 35. If NO in step S11, the flow advances to step S12. If YES in step S11, after a subroutine battery check "BC" is performed in step S15, blind exposure of a film is performed in step S16, and the flow returns to step S5.

In step S12, it is decided whether the state of the rear cover is changed from a closed state to an open state by the rear cover SW 35. If NO in step S12, the flow advances to step S17. If YES in step S12, after a subroutine battery check "BC" is performed in step S13, a flag RWEDF is set to be "0" in step S14. Thereafter, the flow returns to step S5. In this case, the flag RWEDF is a flag indicating a state whether rewinding of the film is ended. If the rewinding is ended, the flag RWEDF is set to be "1". If the rewinding is not ended, the flag RWEDF is set to be "0".

In step S17, it is decided whether the flag RWEDF is set to be "1" or "0". If the flag RWEDF is set to be "1", the flow returns to step S6, and the state of the release switch 32 is not decided. If the flag RWEDF is set to be "0", it is decided in step S18 whether the release switch 32 is set in an ON or OFF state. If the release switch 32 is set in an ON state, the flow advances to step S19. If the release switch 32 is set in an OFF state, the flow advances to step S26.

In steps S19 to S23, a battery check (BC), distance measurement, photometry, control of a photographic lens, shutter control, and rewinding are sequentially performed, and the flow advances to step S24.

In step S24, it is decided whether a film is ended. If YES in step S24, rewinding is performed in step S25, and the flow returns to step S5 to restart the display timer. If NO in step S24, the flow directly returns to step S5.

In step S26, it is decided whether the zoom-up switch 33 or the zoom-down switch 34 is set in an ON or OFF state. If either the zoom-up switch 33 or the zoom-down switch 34 is set in an ON state, the flow advances to step S27. If both the zoom-up switch 33 and the zoom-down switch 34 are set in an OFF state, the flow returns to step S6.

A battery check (BC) is performed in step S27, and zoom control is performed in step S28. Thereafter, the flow returns to step S5 to restart the display timer.

The lens unit is collapsed in step S29, the LCD display circuit 30 is turned off in step S30, and the flow advances to step S31. A subroutine "STOP" for stopping the CPU 20 is performed in step S31, and the flag STPF is set to be "1" in step S32. In this manner, whether the power-saving mode is set can be decided by deciding whether the flag STPF is set to be "1" or "0". In the subroutine "STOP", the operation of the 2-MHz oscillator 36 of the CPU 20 is set in an stop state to set the power-saving mode.

This "STOP" state is released by an interrupt from each of various switches, the 2-MHz oscillator 36 is restarted, and the flow returns to step S1. More specifically, the various switches are the power SW 31, the release SW 32, the zoom-up SW 33, the zoom-down SW 34, the rear cover SW 35, and the like. The operation of the camera is started by these switches, thereby generating interrupts.

The CPU 20 is constituted by a complementary metal oxide silicon (CMOS) circuit. The capacitive component of the gate of the CMOS circuit is charged or discharged each time the 2-MHz oscillator 36 repeats "H" or "L" level. A current used in this operation occupies most of the current consumption of the CPU 20. Therefore, when the 2-MHz oscillator 36 is stopped, the current consumption of the CPU 20 can be made very small. Note that, only the operation portion of the program of the CPU 20 may be stopped without completely stopping the 2-MHz oscillator 36, and the circuit portion for controlling the LCD may be operated.

With the above processes, in performing a battery check, when the flag STPF is set to be "1", it can be decided whether the camera has been left still for four or more minutes or a new battery is loaded.

The embodiments of the present invention based on the above basic example will be described below with reference to the accompanying drawings.

FIG. 5 is a block diagram showing the main arrangement of a camera capable of measuring a power source voltage according to the first embodiment of the present invention. The details of the embodiment in FIG. 5 are the same as those of the basic example shown in FIGS. 1 and 2.

A camera control unit 1 serving as a sequence controlling means for controlling an overall camera is arranged in the camera according to this embodiment. The camera control unit 1 also controls a battery check control unit 2 serving as a voltage determination controlling means.

This battery check control unit 2 controls energization for a dummy load 3 to be electrically connected to a battery serving as a camera power source.

A voltage monitor unit 4 is arranged in the camera, and the voltage monitor unit 4 monitors the voltage of the power source voltage while the dummy load 3 is energized. An output from the voltage monitor unit 4 is transmitted to a voltage comparison unit 5.

In this voltage comparison unit 5, a predetermined voltage is compared with the output from the voltage monitor unit 4, and the comparison result is output to the battery check control unit 2.

When a timer unit 6 receives a signal from the battery check control unit 2, the timer unit 6 begins measuring a time. When a predetermined time has passed, the timer unit 6 outputs a count and signal to the battery check control unit 2.

On the basis of the output from the timer unit 6 and the output from the voltage comparison unit 5, the battery check control unit 2 can decide whether the voltage information is caused by the high-impedance characteristics of a mercury-free alkaline-manganese battery or by a small residual amount of a battery.

Figure 6:
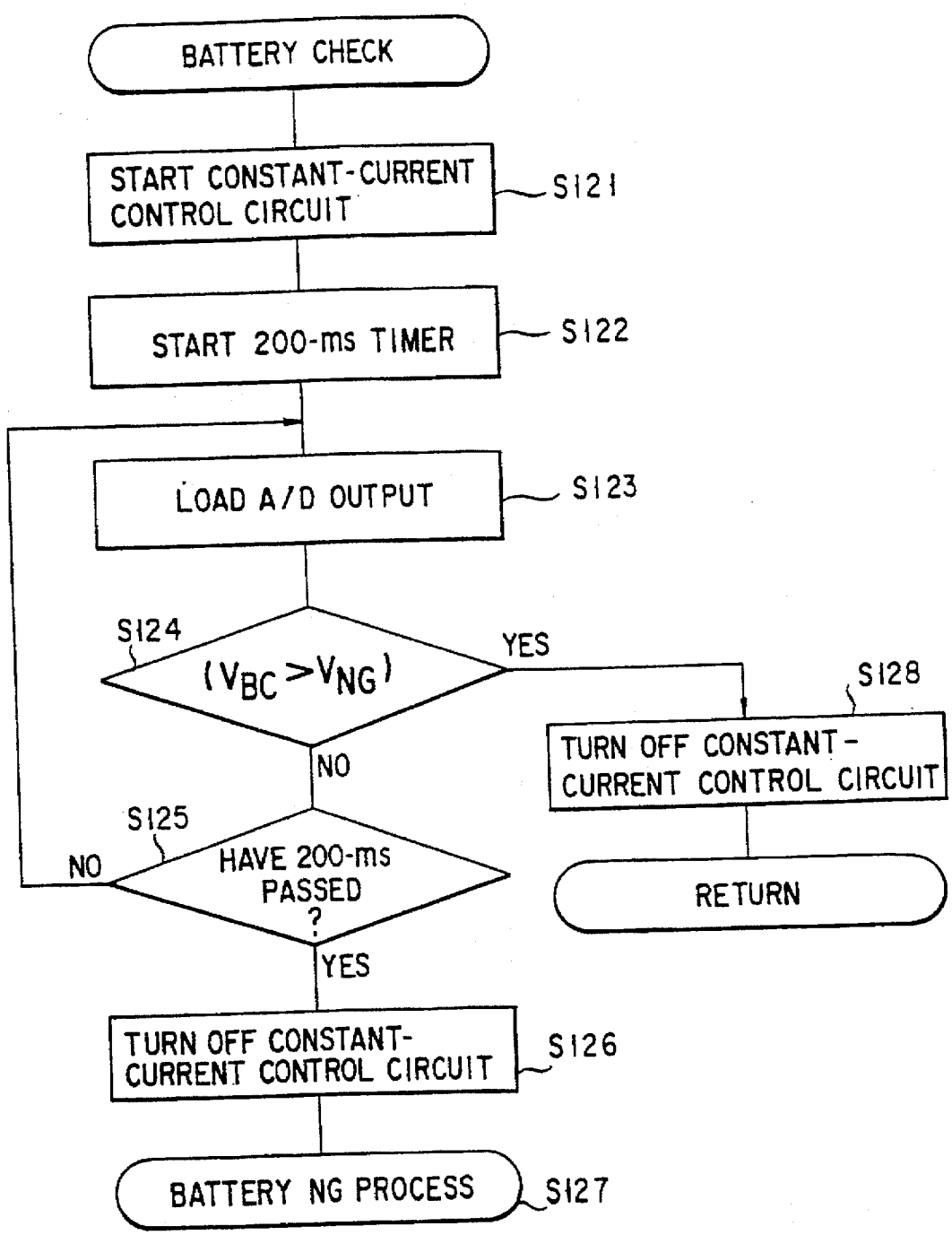
FIG. 6 is a flow chart showing a battery check process executed in the first embodiment of the present invention.

FIG. 6 is a flow chart showing the processes of the battery check subroutine executed in the first embodiment of the present invention.

When the battery check subroutine is executed, a constant-current control circuit 44 shown in FIG. 2 and included in the battery check control unit 2 is started (step S121). When this constant-current control circuit 44 is controlled, a transistor 42 is turned on, and a current flows in a dummy load 43. This current is controlled to be kept constant by the constant-current control circuit 44.

Figure 13:
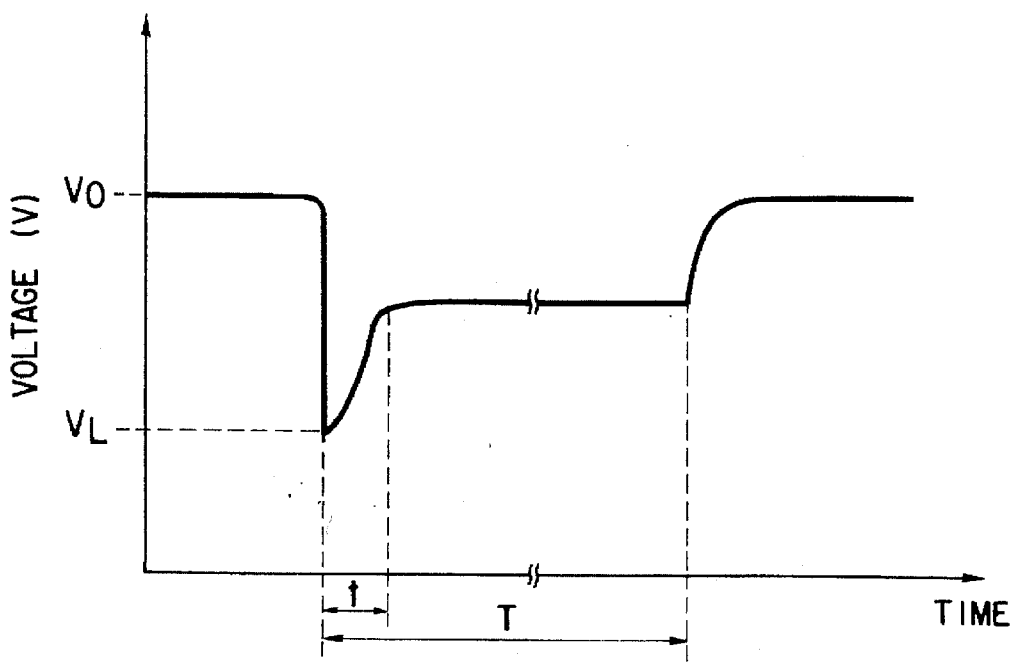
FIG. 13 is a graph showing changes in voltage of a mercury-free alkaline-manganese battery in one discharging operation of n discharging operations shown in FIG. 12.

A timer (not shown) incorporated in a CPU 41 (20) included in the camera control unit 1 is started (step 122). In this case, although the set time of the timer is set to be 200 ms in this embodiment, this set time is not limited to 200 ms. The set time must be determined in consideration of the characteristics of all types of commercially available alkaline-manganese batteries, and is determined by the maximum value of time t shown in FIG. 13. That is, the set time may be set to satisfy (set time of timer)>t.

Note that the value of the set time of the timer may be stored in a nonvolatile memory such as an EEPROM serving as the above determination voltage storage unit 47, and the value of the set time may be read out from the nonvolatile memory and used in a battery check. In this case, if a mercury-free alkaline-manganese battery having new characteristics is developed, the present invention can easily cope with this mercury-free alkaline-manganese battery.

A voltage $V_{BC}$ of a power source battery 46 converted into a digital value by an A/D converter 45 included in the voltage monitor unit 4 is loaded in the CPU 41 (20) included in the voltage comparison unit 5 (step S123), and the loaded voltage $V_{BC}$ of the power source 46 is compared with a voltage value $V_{NG}$ for deciding that a predetermined residual amount of the battery is small (step S124).

If this comparison result satisfies $V_{BC}>V_{NG}$, it is decided that the level of the residual amount of the battery is set to be a level at which the camera is operated without any failure, and the constant-current control circuit 44 is turned off (step S128) to turn off the transistor 42. Energization for the dummy load 43 is stopped, thereby ending the battery check subroutine.

If $V_{BC}>V_{NG}$ is not satisfied in step S124, it is confirmed whether the timer measures 200 ms (step S125). If NO in step S125, the flow returns to step S123, and the voltage $V_{BC}$ of the battery is loaded again.

If YES in step S125, it is decided that the residual amount of the battery is small, and the constant-current control circuit 44 is turned off (step S126) to turn off the transistor 42. The flow advances to a battery NG process loop in which a switch input is not accepted (step S127), and a display for notifying a camera operator of battery NG (the state of the battery is not good) is performed by an LCD display circuit 30 or the like.

As described above, according to the first embodiment of the present invention, discharging is performed for the dummy load to eliminate the initial high impedance of a mercury-free alkaline-manganese battery. For this reason, there can be provided a camera, capable of measuring a power source voltage, in which, when a new mercury-free alkaline-manganese battery is to be checked, this battery is not erroneously determined as a battery having a small residual amount.

In the battery check technique according to the first embodiment, a battery is discharged to monitor the voltage of the battery, the monitored voltage is compared with a comparison voltage value obtained by an internal resistance correlated with a residual energy amount in advance. As a result, when the monitored voltage value is higher than the comparison voltage, it is determined that the residual energy amount is sufficient. This technique itself is the same as a conventional battery check method.

However, the battery check technique of the first embodiment has the following novel point. That is, when the monitored voltage value is smaller than the comparison voltage value, the comparison between the voltages is repeated within a time in which a sleeping phenomenon in which a chemical reaction is not always satisfactorily performed occurs. When a time in which the chemical reaction may be satisfactorily performed has passed, it is not decided that a residual energy amount becomes zero.

In the method of the first embodiment, however, when a sleeping time is short, as in a case wherein a power source voltage is used before a battery check is performed, or when a sleeping phenomenon itself does not occur, the CPU waits for a long time to decide that a residual energy amount is zero.

That is, a time in which a sleeping phenomenon occurs has characteristics which depend on the use state of the power source before a discharging current flows.

More specifically, when the power source has not been used for a long time before a discharging current flows, or when a new power source is used, a time in which a sleeping phenomenon occurs is prolonged. In contrast to this, when a load acts on the power source source immediately before the discharging current flows, and when the power source is set in a use state, a time in which the sleeping phenomenon occurs is shortened, or the sleeping phenomenon itself does not occur.

In the technique according to the first embodiment, an NG determination time in which a battery check is performed is set to be a predetermined value, i.e., (maximum value of sleeping time+α). For this reason, all checks are to be performed, it takes a predetermined time as a time lag.

More specifically, when a power source is not used before a battery check is performed, the technique of the first embodiment can be used without any problem. When the power source is used before a battery check is performed, and a determination time is set as described above, the determination time is unnecessarily prolonged. For this reason, the time lag adversely affects an increase in speed of a camera system or the like.

The second to fourth embodiments arranged to rationally avoid the unnecessary time lag occurring in a battery check according to the technique of the first embodiment will be described below.

Figure 7:
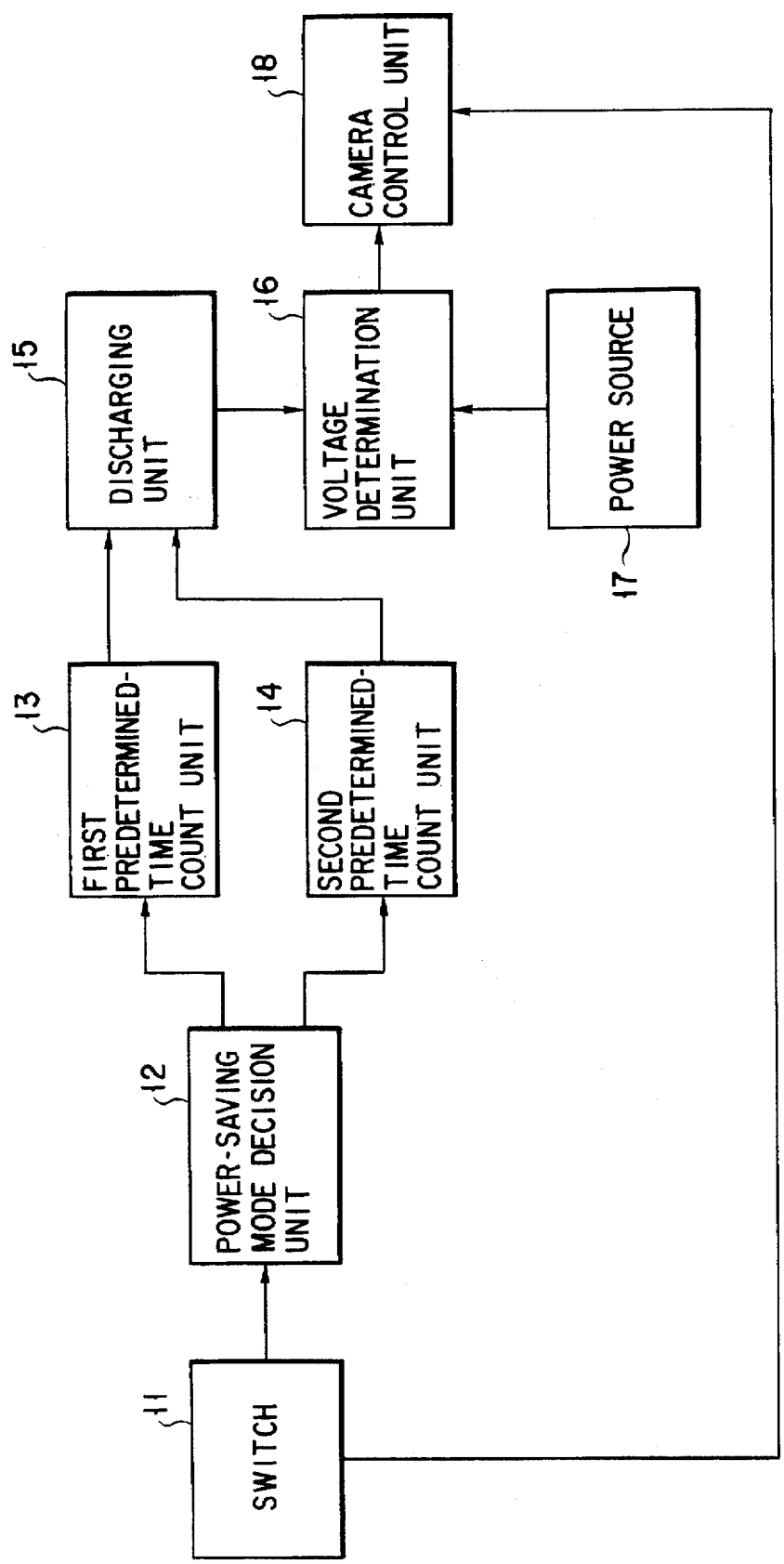
FIG. 7 is a block diagram showing a camera capable of measuring a power source voltage according to the second embodiment.

FIG. 7 is a block diagram showing the arrangement of the main part of a camera capable of measuring a power source voltage according to the second embodiment of the present invention. The details of this camera are the same as those of the camera according to the basic example shown in FIGS. 1 and 2.

Referring to FIG. 7, a plurality of switches 11 are connected to a camera control unit (CPU) 18 constituted by a CPU 20 according to the basic example and connected to a first predetermined-time count unit 13 and a second predetermined-time count unit 14 through a power-saving mode decision unit 12 for deciding whether the mode of the camera is changed from a power-saving mode to a normal mode (to be described later). The first predetermined-time count unit 13 and the second predetermined-time count unit 14 are connected to a discharging unit 15 for causing a predetermined current to flow, and the discharging unit 15 and a power source 17 included in the camera are connected to the camera control unit 18 through a voltage determination unit 16 for determining whether the power source voltage of the power source 17 is lower than a predetermined voltage.

The operation of the camera capable of measuring a power source voltage arranged as described above will be described below.

The camera has the plurality of switches 11 used in the basic example, and the camera has two modes, i.e., a normal mode in which a photographic operation and a camera operation related to photography are executed in accordance with the plurality of switches 11 and a power-saving mode having a smaller power consumption of a circuit than that in the normal mode.

When a predetermined switch 11 is operated, and the power-saving mode decision unit 12 decides that the mode is not changed from the power-saving mode to the normal mode, the discharging unit 15 performs discharging on the basis of the first predetermined-time count unit 13 for a first predetermined time. Thereafter, when the voltage determination unit 16 determines that the power source voltage of the power source 17 is lower than the predetermined voltage, the camera operation is inhibited. When it is decided that the mode is changed from the power-saving mode to the normal mode, the discharging unit 15 performs discharging on the basis of the second predetermined-time count unit 14 for a second predetermined time longer than the first predetermined time. Thereafter, when the voltage determination unit 16 determines that the power source voltage of the power source 17 is lower than the predetermined voltage, the camera operation is inhibited.

Figure 8:
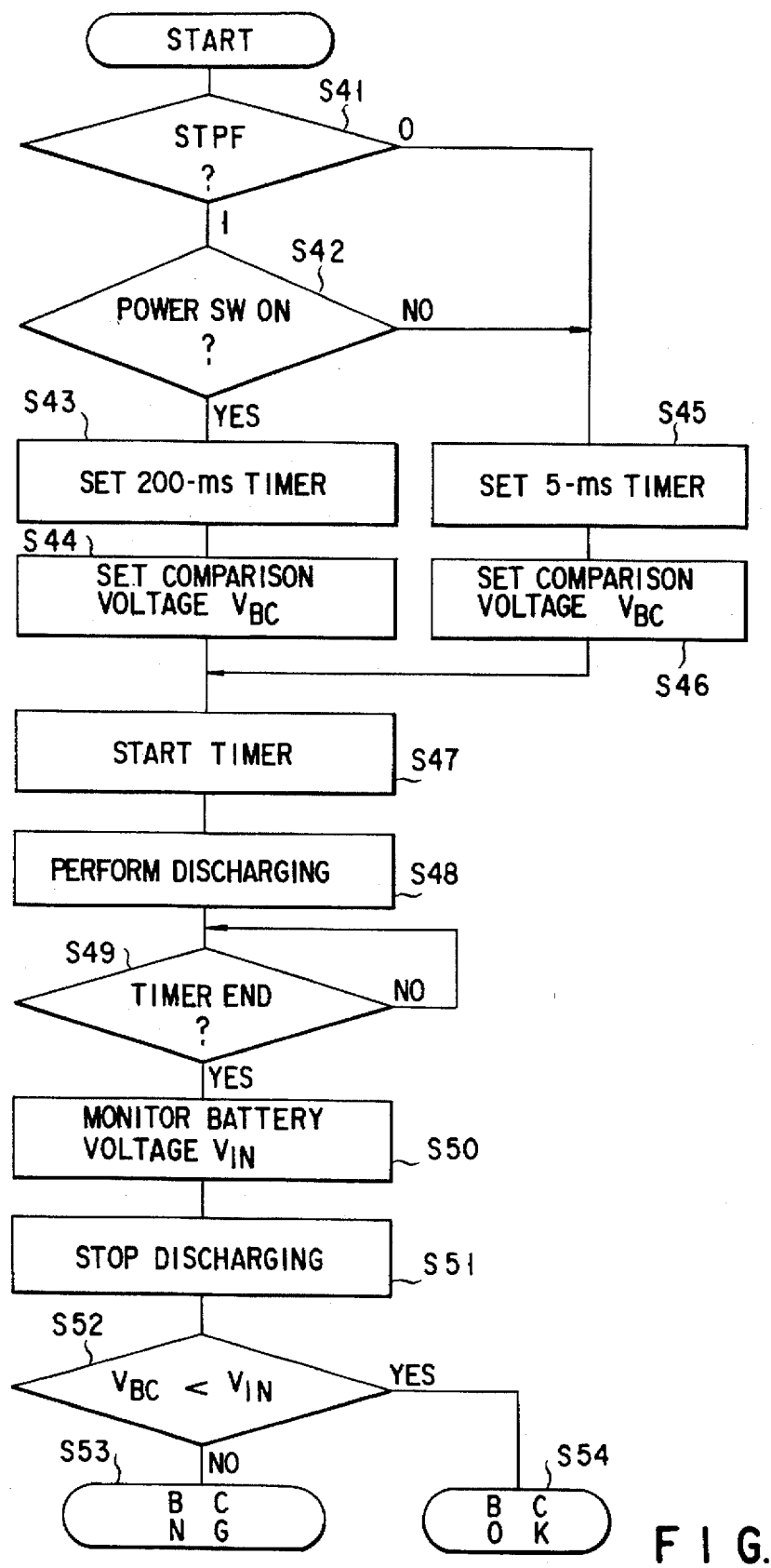
FIG. 8 is a flow chart showing a battery check process executed in the second embodiment of the present invention.

FIG. 8 is a flow chart showing the process of a battery check subroutine executed in the second embodiment of the present invention.

As described in FIGS. 3 and 4, in order to check whether a battery power source may cause a sleeping phenomenon, whether the various switches are operated is decided by detecting switch states in the normal mode or returning the power-saving mode to the normal mode by interrupts of the various switches. Thereafter, a battery check is started.

When the state of the camera upon depression of the various switches is kept set in a normal mode, a flag STPF is set to be "0". When the mode is changed from the power-saving mode to the normal mode, the flag STPF is set to be "1".

Therefore, in step S41, a mode is decided with reference to the flag STPF. Subsequently, in step S42, it is decided in step S42 whether a power switch 31 is depressed. More specifically, when the mode is changed from a power-saving mode to the normal mode, and the power switch 31 is depressed (to be referred to as a sleeping phenomenon decision state hereinafter), a sleeping phenomenon may occur, a process is changed, and the flow advances to step S43. Otherwise, the flow advances to step S45.

A timer is set to be 200 ms in step S43, but the timer is set to be 5 ms which is a normal battery check time which has passed in a state except for a sleeping phenomenon state.

In step S46, the comparison voltage value of the normal battery check is set as a comparison voltage $V_{BC}$, and the flow advances to step S47.

In this case, the discharging time in a sleeping phenomenon decision state is set to be longer than those for other switches (step S43) to avoid a sleeping phenomenon occurring when the battery is started. In addition, the discharging time in the sleeping phenomenon decision state is a time supposed to be set to avoid the sleeping phenomenon. The battery has the following characteristics. That is, when a battery continuously performs discharging, its internal resistance increases, and the discharge voltage of the battery decreases. For this reason, the comparison voltage $V_{BC}$ in the sleeping phenomenon decision state in step S44 is set to be lower than the comparison voltage $V_{BC}$ in step S46, and the flow advances to step S47.

As for operations from step S47, the same operations as in the sleeping phenomenon decision state are also performed for other switches.

The timer is started in step S47, and the battery is discharged immediately in step S48. Passage of a delay time for monitoring a battery voltage is confirmed in step S49. When the time has passed, a battery voltage $V_{IN}$ is measured (step S50) to stop discharging the battery (step S51).

In step S52, the comparison voltage $V_{BC}$ is compared with the battery voltage $V_{IN}$. If the battery voltage $V_{IN}$ is higher than the comparison voltage $V_{BC}$, it is recognized that the residual amount of the battery is sufficiently large. The flow returns to the main routine. When a depressed switch is a release switch 32, an exposure operation is performed; when the depressed switch is a zoom-up switch 33, a motor is driven to perform a zoom-up operation; when the depressed switch is a zoom-down switch 34, the motor is driven to perform a zoom-down operation; and when the depressed switch is the power switch 31, an initial operation for the camera is performed.

When the battery voltage $V_{IN}$ is lower than the comparison voltage $V_{BC}$, it is recognized that the residual amount of the battery is not left to perform the operation of the camera, and the camera is set in a locked state.

Figure 9:
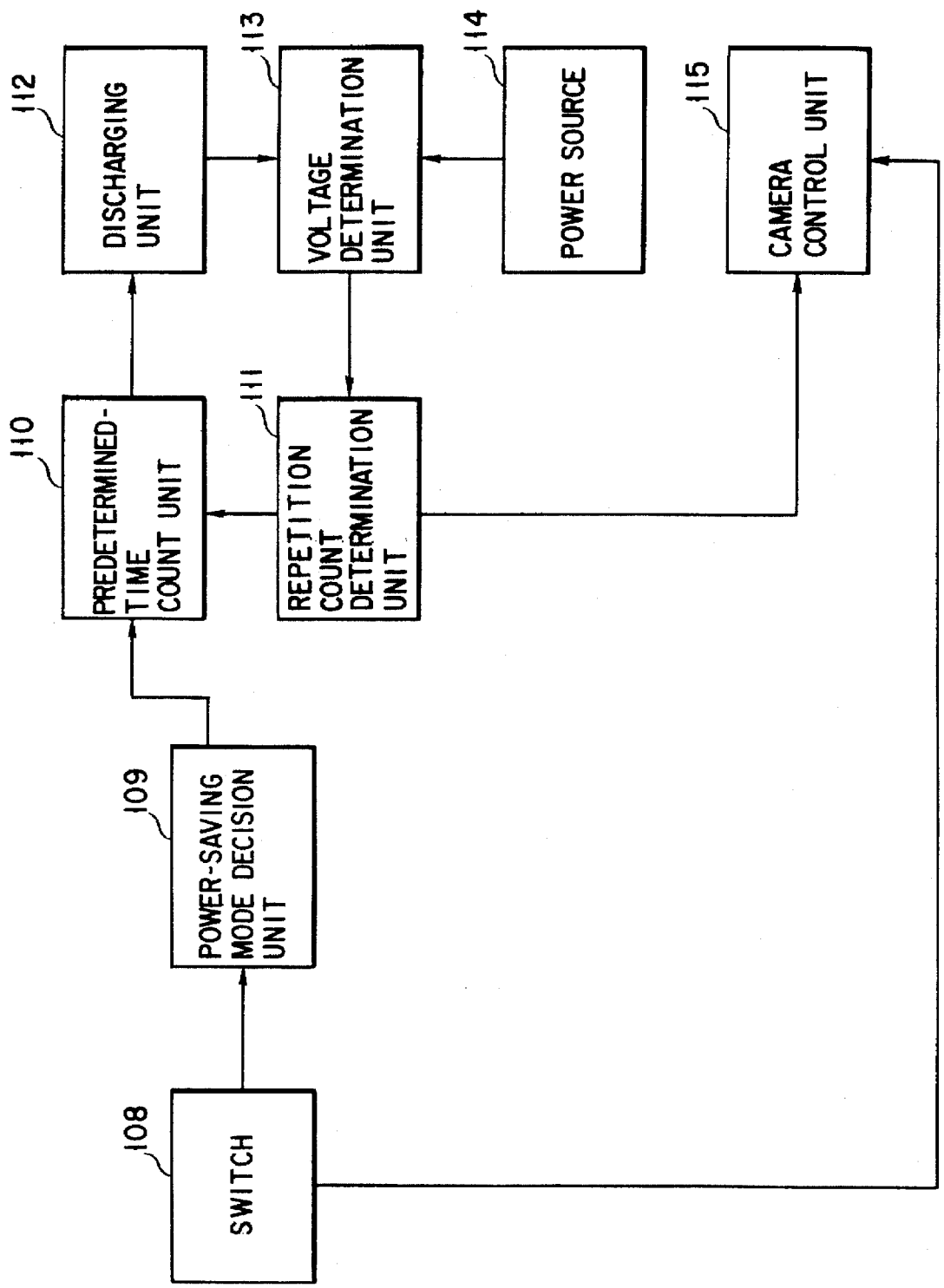
FIG. 9 is a block diagram showing a camera capable of measuring a power source voltage according to the third embodiment of the present invention.

FIG. 9 is a block diagram showing the arrangement of a camera capable of measuring a power source voltage according to the third embodiment of the present invention. The details of this camera are the same as those of the camera according to the basic example shown in FIGS. 1 and 2.

Referring to FIG. 9, a plurality of switches 108 are connected to a camera control unit 115 constituted by a CPU 20 according to the basic example and connected to a predetermined-time count unit 110 through a power-saving mode decision unit 109 for deciding whether the mode of the camera is changed from a power-saving mode to a normal mode. The predetermined-time count unit 110 is connected to a discharging unit 112 for causing a predetermined current to flow, and the discharging unit 112 and a power source 114 included in the camera are connected to a voltage determination unit 113 for determining whether the power source voltage of the power source 114 is lower than a predetermined voltage. The voltage determination unit 113 is connected to a repetition count determination unit 111 for determining whether the above determination is repeated a predetermined number of times, and the repetition count determination unit 111 is connected to the predetermined-time count unit 110 and the camera control unit 115.

The operation of the camera capable of measuring a power source voltage according to the third embodiment arranged as described above will be described below.

As in the second embodiment, the camera according to the third embodiment has the plurality of switches 108, and the camera has two modes, i.e., a normal mode (not shown) in which a photographic operation and a camera operation related to photography are executed in accordance with the plurality of switches 108 and a power-saving mode having a smaller power consumption of a circuit than that in the normal mode.

When a predetermined switch 108 is operated, and the power-saving mode decision unit 109 decides that the mode is not changed from the power-saving mode to the normal mode, the discharging unit 112 performs discharging on the basis of the first predetermined-time count unit 110 for a first predetermined time. Thereafter, when the voltage determination unit 113 determines that the power source voltage of the power source 114 is lower than the predetermined voltage, the camera operation is inhibited. When it is decided that the mode is changed from the power-saving mode to the normal mode, the discharging unit 112 performs discharging on the basis of the second predetermined-time count unit 110 for a predetermined time. Thereafter, when the voltage determination unit 113 determines whether the power source voltage of the power source 114 is lower than the predetermined voltage. If it is determined that the power source voltage of the power source 114 is lower than the predetermined voltage, discharging and voltage determination are repeated. When the repetition count determination unit 111 detects that the discharging and voltage determination are repeated a predetermined number of times, the camera operation is inhibited.

Figure 10:
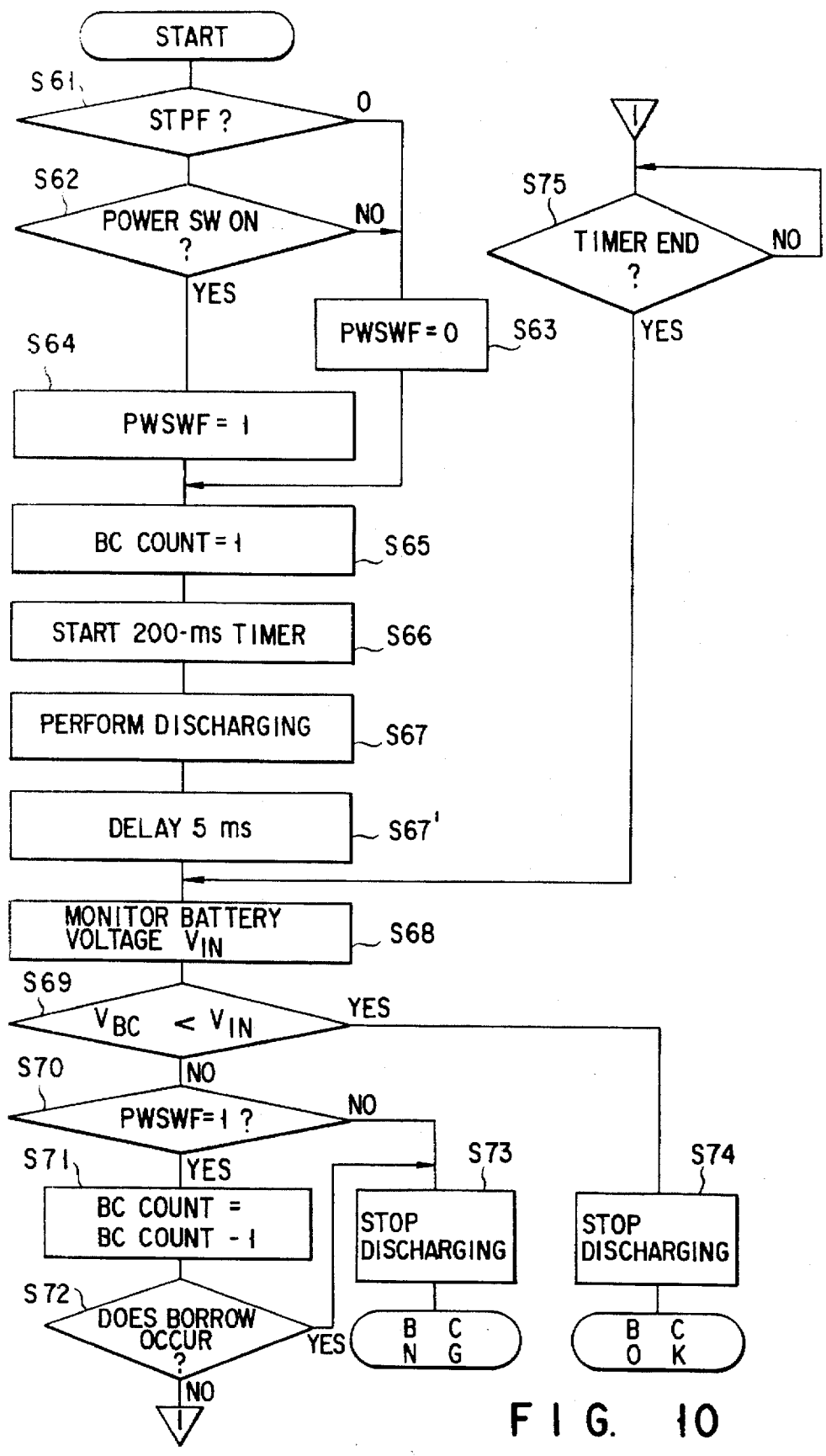
FIG. 10 is a flow chart showing a battery check process executed in the third embodiment of the present invention.
Figure 12:
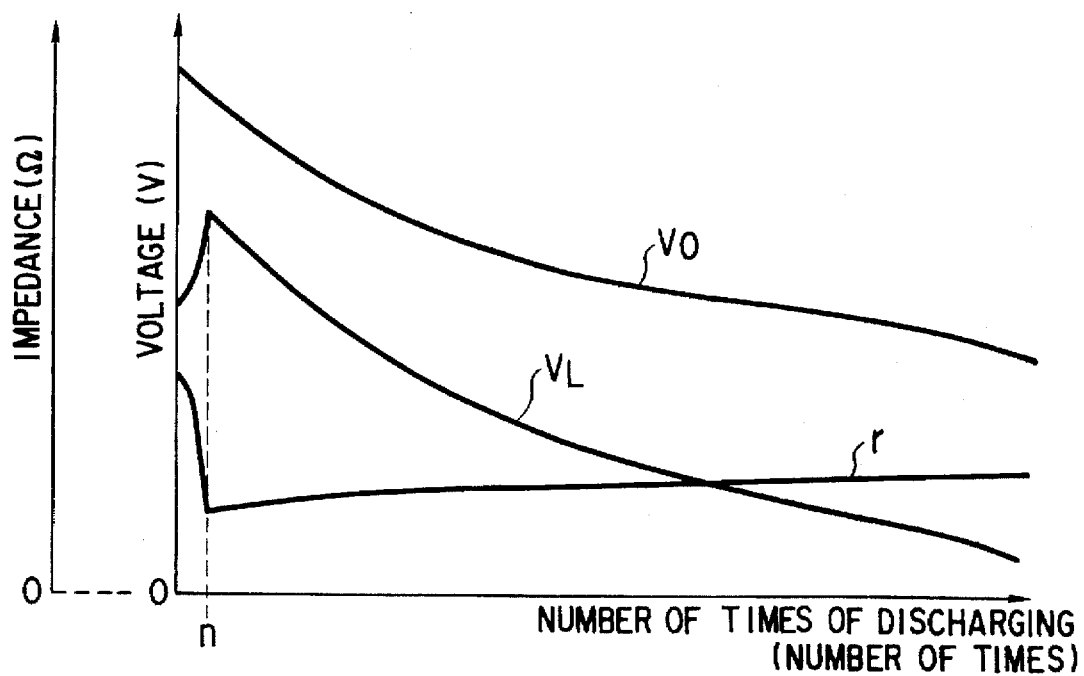
FIG. 12 is a graph showing the discharging characteristics of a mercury-free alkaline-manganese battery with respect to the number of times of discharging to explain a sleeping phenomenon.

FIG. 10 is a flow chart showing the process of a battery check subroutine executed in the third embodiment of the present invention.

In step S61, a change in mode is decided with reference to a flag STPF. In step S62, it is decided whether the power switch 31 is depressed. More specifically, if the mode is changed from the power-saving mode to the normal mode, and the power switch 31 is depressed, the flow advances to step S64 in which a sleeping phenomenon decision state is set. Otherwise, the flow advances to step S63. A flag PWSWF is set to be "1" in step S64, and the flow advances to step S65. In addition, a flag PWSWF is set to be "0" in step S63, and the flow advances to step S65.

In this case, the flag PWSWF is a flag representing a state whether the sleeping phenomenon decision state is set. When the sleeping phenomenon decision state is set, the flag PWSWF is set to be "1". Otherwise, the flag PWSWF is set to be "0".

As for operations from step S65, the same operations are performed regardless of the sleeping phenomenon decision state.

In step S65, as initial setting, the number of battery checks is set to be "1". In steps from step S66, a battery check operation is started. In step S66, a timer in which a discharging time of 200 ms for avoiding the discharging initial high-impedance characteristics of the battery is set is started. In step S67, a constant-current control circuit 44 performs discharging of the battery at a determined current value. In step S67', the CPU waits for 5 ms serving as a delay time for monitoring a power source voltage.

Thereafter, in step S68, a battery voltage $V_{IN}$ is measured, and an A/D converter 45 supplies data to the CPU.

In step S69, a comparison voltage $V_{BC}$ is compared with the battery voltage $V_{IN}$. If the battery voltage $V_{IN}$ is higher than the comparison voltage $V_{BC}$, it is determined that the residual amount of the battery is sufficiently large. The discharging is stopped in step S74, thereby ending the battery check.

When a depressed switch is a release switch 32, an exposure operation is performed; when the depressed switch is a zoom-up switch 33, a motor is driven to perform a zoom-up operation; when the depressed switch is a zoom-down switch 34, the motor is driven to perform a zoom-down operation; and when the depressed switch is the power switch 31, an initial operation for the camera is performed.

When the battery voltage $V_{IN}$ is lower than the comparison voltage $V_{BC}$, the flow advances to step S70 to decide whether the flag PWSWF is set to be "0" or "1".

In step S70, when the flag PWSWF is set to be "0", the normal mode is kept, and no sleeping phenomenon occurs in the battery. Therefore, since the discharging time may be set to be only 5 ms, it is decided that the residual amount of the battery is short. After the discharging is stopped in step S73, the battery check subroutine is ended.

When the flag PWSWF is set to be "1", the sleeping phenomenon decision state is set. In this case, since a sleeping phenomenon may occur, the flow advances to step S71 to compare the voltages with each other again.

In step S71, a battery check count (BC count) is decremented to decide whether a battery check is performed an arbitrary number of times. In step S72, it is decided whether borrow occurs. Note that, according to this embodiment, the BC count=1 is satisfied in step S65. When this BC count is set to be a negative value, borrow occurs. If no borrow occurs, the voltage comparison is not repeated a predetermined number of times. For this reason, the flow advances to step S75. When the borrow occurs, as will be described later, the battery check is ended. For this reason, the flow advances to step S73.

After the operation of the timer having a time of 200 ms in which discharging is performed to avoid initial high-impedance discharging characteristics caused by the sleeping phenomenon of the battery is confirmed in step S75, the flow advances to step S68. As in the above embodiments, the voltage is monitored in step S68, and voltage comparison is performed in step S69.

In this case, in step S69, the comparison voltage $V_{BC}$ is compared with the battery voltage $V_{IN}$. If the battery voltage $V_{IN}$ is higher than the comparison voltage $V_{BC}$, a battery check failure in the first battery check is a sleeping phenomenon, the failure of contact of the battery, or a temporary voltage drop caused by, e.g., noise, and the residual capacity of the battery is sufficiently large.

When the battery voltage $V_{IN}$ is lower than the comparison voltage $V_{BC}$, the flow passes through step S70 and advances to step S71. In step S71, borrow occurs because voltage comparison is performed an arbitrary number of times (twice). The flow advances to step S73. In step S73, although a time for avoiding a sleeping phenomenon has passed, since the battery voltage $V_{IN}$ is lower than the comparison voltage $V_{BC}$, the residual capacity of the battery is not satisfactorily large, and a battery check NG process is executed.

FIG. 11 is a flow chart showing the process of a battery check executed in the fourth embodiment of the present invention.

Since the arrangement of members in the fourth embodiment is the same as that shown in FIGS. 1 and 2 and is the same as that of the basic example, a description thereof will be omitted.

In step S81, a change in mode is decided with reference to a flag STPF. Subsequently, in step S82, it is decided whether a power switch 31 is depressed. More specifically, when the mode is changed from a power-saving mode to a normal mode, and the power switch 31 is depressed, the flow advances to step S83 in which a sleeping phenomenon decision state is set. Otherwise, the flow advances to step S84.

In step S83, a 200-ms timer is set and started. In step S84, since no timer is required, the timer is set in an end state.

In steps from step S85, the flow passes through the same steps regardless of different types of switches.

In step S85, in order to measure the voltage of the battery, a constant-current control circuit 44 performs discharging of the battery at a determined current value.

Subsequently, in step S86, a delay of 5 ms set to measure a voltage when the voltage becomes stable has passed. Thereafter, in step S87, the battery voltage is converted into data by an A/D converter 45, and the battery voltage $V_{IN}$ serving as this data is received by a CPU. In step S88, the discharging is stopped.

In step S89, it is decided whether the battery voltage $V_{IV}$ is higher than the comparison voltage $V_{BC}$. If YES in step S89, it is determined that the residual capacity of the battery is sufficiently large, and the battery check is ended.

If NO in step S89, a delay of 20 ms is set to return an open-circuit voltage in step S90. Subsequently, in step S91, it is decided whether the timer is ended. When the flag STPF is set to be "0", and a depressed switch is a release switch 32, a zoom-up switch 33, or a zoom-down switch 34, i.e., when a sleeping phenomenon decision state is not set, the timer is not operated from the beginning. For this reason, in the battery check, it is determined that the residual capacity of the battery is not sufficiently large, and the battery becomes NG. Therefore, the battery check is performed only once.

When the flag STPF is set to be "1", and a depressed switch is the power switch 31, i.e., when a sleeping phenomenon decision state is set, 200 ms which are a time for avoiding a sleeping phenomenon in the first battery check have not passed. For this reason, the flow returns to step S85. More specifically, when the battery voltage $V_{IN}$ is lower than the comparison voltage $V_{BC}$ in step S89, a 200-ms battery check is continued.

When 200 ms have passed while the battery voltage $V_{IN}$ is kept low, it is decided that a battery voltage drop is not caused by a sleeping phenomenon but is caused by a small residual amount of the battery, and the battery check is ended.

In addition, assume that the sleeping phenomenon is eliminated, that a battery voltage is recovered, and that the battery voltage $V_{IN}$ becomes higher than the comparison voltage $V_{BC}$. In this case, it is determined that the battery voltage $V_{IN}$ is temporarily lower than the comparison voltage $V_{BC}$ in the previous voltage comparison because of the sleeping phenomenon, and it is determined that the residual amount of the battery is sufficiently large.

As has been described above, in the second to fourth embodiments of the present invention, when a battery free from a sleeping phenomenon in which a high impedance is generated in initial discharging is used, or a battery in which a sleeping phenomenon occurs in a short time is used, a battery check time can be shortened. When a battery in which a sleeping phenomenon in which a high impedance is generated in initial discharging occurs for a predetermined time or more is used, discharging is performed by a dummy load for a time long enough to eliminate the sleeping phenomenon. Therefore, a highly accurate battery check free from erroneous decision can be performed.

What is claimed is:

1. A battery check device for a camera, comprising:
   a discharging circuit to which current flows from a battery;
   discharging time setting means for setting a discharging time for determining that an internal resistance of the battery has increased due to non-use of the battery so as to temporarily reduce an output voltage of the battery, said discharging time being longer than a time required to check a residual energy amount of the battery;
   determining means for determining whether a voltage of said discharging circuit has reached a reference voltage specific to the battery within said discharging time; and
   mode state determining means for determining whether an operating mode of a camera remains in a normal mode in which the camera performs a normal photographic sequence or whether the operating mode of the camera has been changed to the normal mode from a power-saving mode in which the camera consumes less power than in the normal mode;
   wherein said discharging time setting means includes:
      (i) means for setting a discharging time corresponding to the time required to check the residual energy amount of the battery when said mode state determining means determines that the operating mode of the camera remains in the normal mode; and
      (ii) means for setting said discharging time for determining that the internal resistance of the battery has increased due to non-use of the battery when said mode state determining means determines that the mode of the camera has been changed to the normal mode from the power-saving mode; and
   wherein the residual energy amount of the battery is determined to be insufficient when said determining means determines that the voltage of said discharging circuit has not reached the reference voltage specific to the battery within said discharging time.

2. The battery check device according to claim 1, wherein said battery check device further comprises operation stopping means for stopping an operation of a camera when said determining means determines that the voltage of said discharging circuit has not reached the reference voltage specific to said battery within said discharging time.

3. A camera having a battery check function, said camera comprising:
   a discharging circuit to which current flows from a battery in the camera;

mode switching means for switching an operating mode of the camera between a normal mode in which the camera performs a normal photographic sequence and a power-saving mode in which the camera consumes less power than in the normal mode;

mode state determining means for determining whether the operating mode of the camera remains in the normal mode or has been changed to the normal mode from the power-saving mode;

discharging time setting means for setting a first discharging time of the battery when the mode state determining means determines that the operating mode of the camera remains in the normal mode and for setting a second discharging time longer than the first discharging time when the mode state determining means determines that the operating mode of the camera has been changed to the normal mode from the power-saving mode, said first discharging time corresponding to a time required to check a residual energy amount of the battery and said second discharging time corresponding to a time required to determine whether an internal resistance of the battery has increased so as to temporarily reduce an output voltage of the battery;

voltage detecting means for detecting the voltage of the discharging circuit;

voltage comparing means for comparing the detected voltage of the discharging circuit with a reference voltage specific to the battery;

battery power determining means for: (i) determining that the residual energy amount of the battery is insufficient when the first discharging time has been set and said voltage comparing means determines that the detected voltage of the discharging circuit is lower than the reference voltage after the first discharging time has elapsed; (ii) determining that the internal resistance of the battery has increased so as to temporarily reduce an output voltage of the battery when the second discharging time has been set and said voltage comparing means determines that the voltage of the discharging circuit is lower than the reference voltage after the first discharging time has elapsed but higher than the reference voltage after the second discharging time has elapsed; and (iii) determining that the residual energy amount of the battery is insufficient when the second discharging time has been set and said voltage comparing means determines that the voltage of the discharging circuit is lower than the reference voltage after the second discharging time has elapsed; and operation stopping means for stopping an operation of the camera when said battery power determining means determines that the residual energy amount of the battery is insufficient.

4. A camera having a battery check function, said camera comprising:

a discharging circuit to which current flows from a battery in the camera;

mode state determining means for determining whether an operating mode of the camera remains in a normal mode or has been changed to the normal mode from a power-saving mode in which the camera consumes less power than in the normal mode;

discharging time setting means for setting a first discharging time of the battery when the mode state determining means determines that the operating mode of the camera remains in the normal mode and for setting a second discharging time longer than the first discharging time when the mode state determining means determines that the operating mode of the camera has been changed to the normal mode from the power-saving mode, said first discharging time corresponding to a time required to check a residual energy amount of the battery and said second discharging time corresponding to a time required to determine whether an internal resistance of the battery has increased so as to temporarily reduce an output voltage of the battery;

voltage comparing means for comparing a reference voltage specific to the battery with a voltage of the discharging circuit detected;

operation stopping means for stopping an operation of the camera when (i) the first discharging time has been set and said voltage comparing means determines that the detected voltage of the discharging circuit is lower than the reference voltage after the first discharging time has elapsed; and (ii) the second discharging time has been set and said voltage comparing means determines that the voltage of the discharging circuit is lower than the reference voltage after the second discharging time has elapsed; and means for enabling the camera to perform a normal photographic sequence when the second discharging time has been set and said voltage comparing means determines that the voltage of the discharging circuit is lower than the reference voltage after the first discharging time has elapsed but higher than the reference voltage after the second discharging time has elapsed.

5. The camera according to claim 4, wherein a predetermined operation sequence of the camera is initiated by a plurality of switch means which are operated responsive to one of opening or closing of a rear cover of the camera and inserting a battery in the camera.

6. The camera according to claim 5, wherein the reference voltage is higher than a voltage of the battery required to begin the predetermined operation sequence of the camera.

7. A camera capable of operating in a normal mode in which the camera performs a normal photographic sequence and a power-saving mode in which the camera consumes less power than in the normal mode, comprising:

a discharging circuit connected to a power source of the camera;

mode state determining means for determining whether the operating mode of the camera remains in the normal mode or has been changed to the normal mode from the power-saving mode;

discharging time setting means for setting a discharging time during which a current flows from said power source to the discharging circuit, said discharging time being set in accordance with an output of said operation state detecting means; and power source checking means for measuring a discharge voltage of said power while said power source is discharged for said discharging time set by said discharging time setting means, and for comparing the measured discharge voltage with a predetermined voltage to thereby detect a residual energy amount of said power source.

8. A camera according to claim 7, wherein said discharge time setting means includes means for setting a first discharging time When said mode state determining means determines that the operating mode of the camera has been changed to the normal mode from the power-saving mode, and for setting a second discharging time when said mode state determining means determines that the operating mode of the camera remains in the normal mode.

9. A camera according to claim 8, wherein the first discharging time is longer than a time during which an output voltage of the power source remains low due to a temporarily increased internal resistance of the power source.

10. A camera capable of operating in a normal mode in which the camera performs a normal photographic sequence and a power-saving mode in which the camera consumes less power than in the normal mode, comprising:

a discharging circuit connected to a power source of the camera;

mode state determining means for determining whether the operating mode of the camera remains in the normal mode or has been changed to the normal mode from the power-saving mode;

discharging time setting means for setting a first discharging time when said mode state determining means determines that the operating mode of the camera has been changed to the normal mode from the power-saving mode, and for setting a second discharging time when said mode state determining means determines that the operating mode of the camera remains in the normal mode; and voltage determining means for comparing a voltage of said power source with a predetermined voltage after a current flows from said power source to the discharging circuit during one of the first discharging time and the second discharging time set by said discharging time setting means, and for determining that a residual energy amount of said power source is insufficient when the voltage of said power source is lower than the predetermined voltage.

11. The camera according to claim 10, wherein said voltage determining means is operable responsive to a plurality of switch means which are operated responsive to one of a rear cover of the camera being opened or closed and a power source battery being inserted into the camera.

12. The camera according to claim 10, wherein the first discharging time is longer than a time during which an output voltage of the power source remains low due to a temporarily increased internal resistance of the power source.

13. The camera according to claim 11, wherein said predetermined voltage is higher than a voltage required by said power source to enable operation of the camera.

14. A camera capable of operating in a normal mode in which the camera performs a normal photographic sequence and a power-saving mode in which the camera consumes less power than in the normal mode, comprising:

a discharging circuit connected to a power source of the camera;

mode state determining means for determining whether the operating mode of the camera remains in the normal mode or has been changed to the normal mode from the power-saving mode;

timer means for measuring a first predetermined time;

voltage determining means for causing said discharging circuit to discharge said power source during the first discharging time, and for comparing a voltage of said power source with a predetermined voltage; and discharging control means for determining that the voltage of the power source is normal when said voltage determining means determines that the voltage of said power source is higher than the predetermined voltage, and for controlling said timer means and said voltage determining means to repeat voltage determination a prescribed number of times while the operating mode of the camera remains in the normal mode when said voltage determining means determines that the voltage of said power source is lower than the predetermined voltage.

* * * * *